United States Patent [19]

Sparks et al.

[11] Patent Number: 4,824,234
[45] Date of Patent: Apr. 25, 1989

[54] PUTTING GLASSES

[76] Inventors: John M. Sparks, 44498 Windmill Dr., Canton, Mich. 48187; Emily S. Hackler, 18752 Via San Marco, Irvine, Calif. 92715

[21] Appl. No.: 164,781

[22] Filed: Mar. 8, 1988

Related U.S. Application Data

[63] Continuation of Ser. No. 926,098, Nov. 3, 1986, abandoned.

[51] Int. Cl.⁴ ................................................ G02C 9/00
[52] U.S. Cl. ..................................... 351/158; 351/53; 351/47
[58] Field of Search ................................... 351/44–49, 351/53, 163, 158

[56] References Cited

U.S. PATENT DOCUMENTS

| | | | |
|---|---|---|---|
| 1,257,667 | 2/1918 | Barr | 351/45 |
| 3,233,249 | 2/1966 | Baratelli et al. | 351/44 |
| 4,300,819 | 11/1981 | Taylor | 351/163 |

Primary Examiner—Rodney B. Bovernick
Assistant Examiner—Jay Ryan
Attorney, Agent, or Firm—Walter A. Hackler

[57] ABSTRACT

An eyeglass attachment for practicing and/or playing the game of golf includes a frame having a portion for supporting an optical device in front of each eye of a wearer and a pair of optical devices disposed in the frame. Each of the optical devices, which may be a pair of lens, include two spaced apart relatively dark transparent portions with a relatively clear narrow portion therebetween. The clear narrow portions are oriented to enable clear visibility between the right and left side of the wearer. This enables the wearer to align a golf ball within the relatively clear portion to aid in the user's coordination of striking the golf ball in a coordinated manner. Blinders may be provided and attached to the frame so as to extend between each optical device and the wearer's temple for substantially eliminating light from entering between the optical devices and the wearer's eyes. In addition, the frame may be provided with hooks, or the like, for enabling attaching of the frame to a conventional pair of glasses.

4 Claims, 1 Drawing Sheet

PUTTING GLASSES

This application is a continuation of application Ser. No. 926,098, filed Nov. 3, 1986 now abandoned.

The present invention generally relates to golfing aids and, more particularly, is directed to glasses for practicing and/or playing the game of golf. Golf is a game enjoyed by a multitude of people throughout the world. For many, it is a profession while for others it provides a means for relaxation and enjoyment.

Despite the golf player's ability and experience, most are interested in improving their game and rely on coaching services and any number of golfing aids available for self-improvement for the game of golf.

Particularly important in the game is the portion played on the green, that is, the putting game. In order to improve the putting game, a player must learn to control his or her eye-hand coordination.

A great number of devices are currently available for the improvement of eye-hand coordination required during putting. Examples of such putting aids include portable cups and layout cloths for enabling the user to practice in his own home or office. In addition, any number of devices are available for directing the player to place his hands in a particular grip on the putter in order to improve his control thereof. Finally, there appears to be an almost infinite number of clubs designed as specialized putters to improve the golfer's game.

Over the years, there have been any number of body control devices that a player can wear during the practice or playing of golf in order to limit the movement of his arms and/or legs, so as to restrict and control the path of the golf club in a preselected pattern in order to properly address and strike the ball so that it ends up in or near the cup.

Well known techniques for the improvement of the putting game includes the ability of the golfer to keep his or her head stable and to move only the eyes in tracking the golf club action.

The present invention provides a useful golfing aid in establishing proper eye, hand control patterns for the golfer in order to successfully improve the golfer's game by reducing his time on the green. Use of the method and device of the present invention enables the user to practice and play golf through conditioning so that the user only moves his or her eyes in tracking the golf club action during putting of the ball.

SUMMARY OF THE INVENTION

Glasses for practicing and/or playing the game of golf in accordance with the present invention include a frame having means for supporting an optical device in front of each eye of a wearer and a pair of optical devices disposed in the frame, with each of the optical devices including means for enabling the wearer to align the view of a golf ball along a line on each of the optical devices. Each of these extend between a right and a left side of each optical device, respectively. In this manner, a wearer of the glasses made in accordance with the present invention is able to align the ball along the line of the glasses. This forces full eye control in tracking the golf club action. It also forces the wearer to hold his head steady during the swinging of his putter in order to improve the striking and follow through of the putter by forcing the wearer to move only his or her eyes in tracking the golf ball. More particularly, glasses in accordance with the present invention have each of the lines disposed approximately midway between the top and bottom of each optical device, respectively. In addition, to facilitate those who already wear prescription lenses, the frame may include means for attaching the frame to conventional-type glasses.

Preferably, glasses for practicing and/or playing the game of golf include a pair of optical devices which include means for limiting clear visibility by the wearer through the optical devices to a realtively narrow band compared to the wearer's normal range of vision. The narrow band is oriented to enable clear visibility between the right and left hand side of the wearer.

The optical device may include two opaque panels disposed in the frames, a first of the opaque panels extending downward from the top of the frame and a second of the two opaque panels extending upward from the bottom of the frame, with the first and second opaque panels being spaced apart from one another to limit the visibility through the optical devices to a relatively narrow band.

Alternatively, and preferably, the optical devices each include a lens, with the lens having two spaced apart relatively dark transparent portions with a relatively clear portion therebetween. This has the advantage of enabling the wearer to have a full field of view through the glasses with a light or relatively clear portion between two darkened transparent, or tinted, portions.

To be most effective, the narrow band of visibility of each optical device is aligned with one another and, further, blinder means may be provided, which extend between each optical device and the wearer's temple, for substantially eliminating light from entering between the optical devices and the wearer's eyes. This feature further enhances concentration of the wearer in keeping the ball in view within the relatively clear portion of the optical devices by preventing otherwise disturbing light or distractive movements surrounding the wearer/player from entering the wearer's field of view.

In order for the wearer to utilize the present invention on the course without attracting undue attention to himself or the golfing aid, each of the lens may include a coating means for reflecting light in a uniform manner across the entire lens to prevent a non-wearer of the glasses from seeing the relatively dark and relatively clear portions of the lens. In other words, a non-wearer would see either a uniform color or a reflective silverized type of lens which may be indistinguishable from presently available silver-type reflecting sunglasses.

A method for practicing and/or playing the game of golf utilizing the present invention includes the steps of wearing a frame supporting and optical device in front of each eye of a wearer with the optical device including means for enhancing the visibility through the optical devices by a person to a relatively narrow band compared to the wearer's normal range of vision. The narrow band is oriented to enable enhanced visibility between a right and a left side of the wearer. The method also includes the steps of approaching a golf ball disposed in the surface remote from the optical devices, aligning the optical devices, so that the golf ball is visible to the wearer through the narrow band and thereafter striking the golf ball with a golf club while maintaining visibility to the wearer of the golf ball through the narrow band.

BRIEF DESCRIPTION OF THE DRAWINGS

A better understanding of the present invention may be had from the consideration of the following detailed description, taken in conjunction with the accompanying drawings, in which.

DETAILED DESCRIPTION

Figure 1:
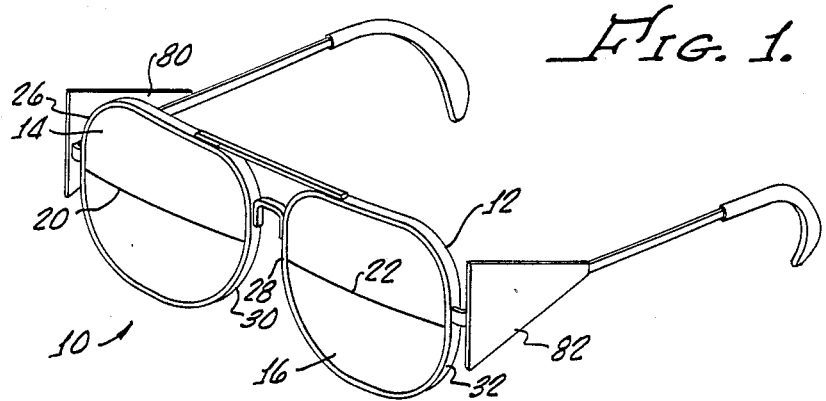
FIG. 1 is a perspective view of glasses in accordance with the present invention, showing generally a pair of lenses in a frame with a line through the glasses to enable a wearer to align a golf ball therewith, and a pair of blinders attached to the frame to prevent distracting light and/or other distractions from entering the field of view of the wearer.

Turning now to FIG. 1, glasses 10 in accordance with the present invention include a frame 12 which provides means for supporting an optical device 14, 16 in front of each eye of a wearer (not shown).

The frame 12 may be of any suitable type for supporting the lenses 14, 16 and enabling the glasses 10 to be worn in a conventional manner. As shown in FIG. 1, the lenses 14, 16 which may be formed from any suitable optical material, such as glass or plastic, include means for enabling the wearer (not shown) to align the view of a ball (not shown) along a line 20, 22, which extends between a right side 26 and 28, and a left side 30, 32 of each of the lenses 14, 16. Alternatively, each of the lenses 14, 16 may include means for enhancing the visibility through each lens along the lines 20, 22. This is more clearly shown in FIG. 2.

Figure 2:
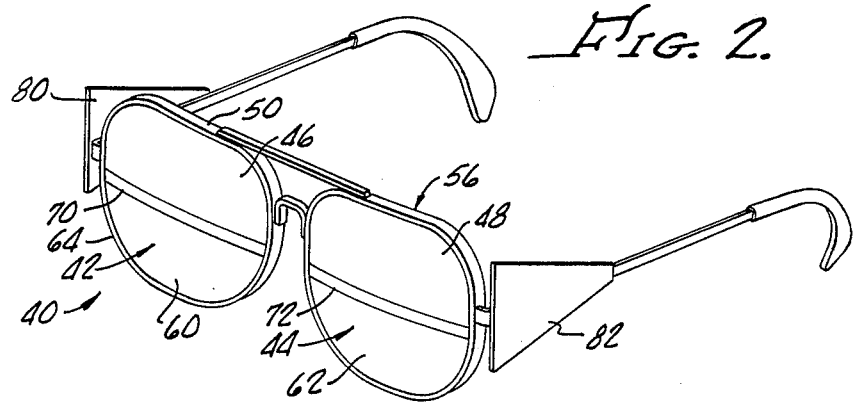
FIG. 2 is an alternative embodiment of the present invention showing each lens having two relatively dark transparent portions or opaque panels with a realtively light transparent portion therebetween for enabling the wearer to align a golf ball therein.

In FIG. 2, glasses 40 may include optical devices, or lenses, 42, 44 which include either an opaque, or transparent, panel, or a portion 46, 48 extending downward from a top 50 of a frame 56 and a second portion 60, 62 extending outwardly from a bottom 64 of the frame 56. In this manner, clear visibility is limited to a band 70, 72.

Preferably, the narrow band 70, 72 of clear visibility of each lens 42, 44 is disposed below a transverse centerline 76 and the band may have a width of about ⅛" to about ¼".

In addition, blinders 80, 82 may be attached to the frames 12 or 56, respectively, which may be of a soft pliable material, or a rigid material, conventionally used and mounted to the frames for preventing light or other distractions from entering the field of view of the wearer.

Figure 3:
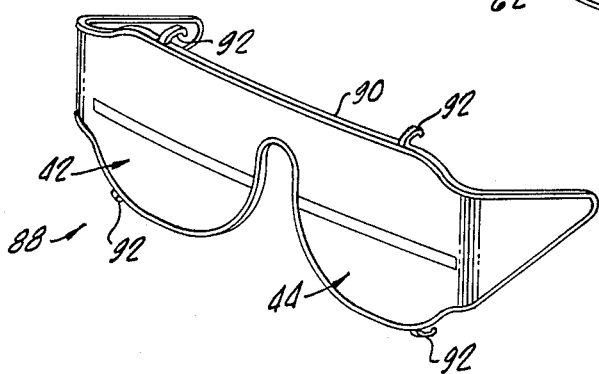
FIG. 3 is an alternative embodiment of the present invention for use as an attachment to conventional prescription-type glasses; and, FIG. 4 is a perspective view of glasses in accordance with the present invention showing the lenses therein silverized, or coated, in order that the entire lens appears uniformly colored or reflecting to a non-wearer of the glasses.

An alternative embodiment of the present invention is shown in FIG. 3 wherein a frame 90 supports optical lenses 42, 44 and also provides hooks 92, configured and disposed in a conventional manner for attaching the frames 90 to a conventional pair of prescription-type lenses.

Figure 4:
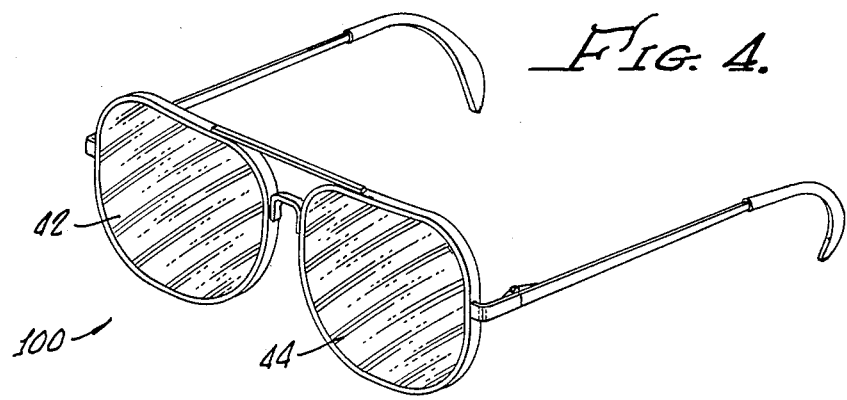

FIG. 4 shows yet another alternative embodiment 100 of the present invention in which the lenses 42, 44 have been silverized, or coated, in order to reflect or absorb light in a uniform manner across the entire lenses 42, 44 to prevent a non-wearer of the glasses from seeing relatively dark and relatively clear portions of the lens.

In the method of the present invention, the glasses 10, 40, 88 or 100 are worn by a wearer (not shown) in order to enhance the visibility of the optical devices by the person to a relatively narrow band compared to the wearer's normal range of vision. The narrow band 70, 72 as illustrated in FIG. 2, is oriented to enable visibility from the right to the left side of the wearer with the bands 70, 72 aligned with one another just below a transverse centerline 76.

Thereafter, the wearer approaches a golf ball disposed on a surface remote from the optical devices, or lenses, and aligns the lenses so that the golf ball is visible to the wearer through the narrow band.

In this manner, the wearer's entire visual field should be limited except to the critical area of the band 70, 72, and the wearers should practice moving the putter and their eyes so that the eyes move along the band 70, 72, while striking the golf ball with a golf club.

Although there has been described hereinabove glasses and a method for practicing and/or playing the game of golf in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. An eyeglass attachment for practicing and/or playing the game of golf, said eyeglass attachment comprising:

a frame having means for supporting an optical device in front of each eye of a wearer and means for attaching said frame to a conventional pair of eyeglasses;

an optical device disposed in said frame, said optical device including lens means for limiting clear visibility through the optical device by the wearer to a relatively narrow band compared to the wearer's normal range of vision, said narrow band being oriented to enable clear visibility between the right and left side of the wearer, said lens means including two spaced apart dark transparent portions with a clear portion therebetween, said optical device including side portions thereof adapted for extending along the wearer's temple for reducing light from entering the wearer's eyes from the side of the wearer, said optical device lens means and side portions being formed from a single piece of material;

coating means, disposed on each lens over both the dark transparent portion and the clear portions, for reflecting light in a uniform manner across the entire lens to prevent a non-wearer of the glasses from seeing the dark and clear portions of the lens.

2. The glasses according to claim 1 wherein the narrow band of clear visibility of the optical device is disposed below a transverse centerline of the optical device.

3. The glasses according to claim 2 wherein the width of the narrow band of clear visibility is within the range of about ⅛ inches to about ¼ inches.

4. An eyeglass attachment for practicing and/or playing the game of golf, said eyeglass attachment comprising:
   a frame having means for supporting a lens in front of each eye of a wearer and means for attaching said frame to a conventional pair of eyeglasses; and
   a lens disposed in said frame, said lens including means defining a dark transparent portion and a light transparent portion, said light transparent portion comprising a narrow band compared to the wearer's normal range of vision, said narrow band extending transversely across the lens, said lens being formed from a single piece of material and including side portions thereof adapted for extending along a wearer's temple for reducing light from entering the wearer's eyes from the side of the wearer.

* * * * *